United States Patent [19]

Ebersole et al.

[11] 4,025,195
[45] May 24, 1977

[54] IMAGE SUBTRACTION/ADDITION SYSTEM

[75] Inventors: John F. Ebersole, Bedford; James C. Wyant, Carlisle, both of Mass.

[73] Assignee: Itek Corporation, Lexington, Mass.

[22] Filed: July 22, 1974

[21] Appl. No.: 490,479

[52] U.S. Cl. .............................. 356/71; 356/106 R
[51] Int. Cl.² ...................... G06K 9/08; G01B 9/02
[58] Field of Search ................. 356/71, 106 R, 107, 356/113, 109

[56] References Cited

UNITED STATES PATENTS

| | | | |
|---|---|---|---|
| 2,764,055 | 9/1956 | Clemens et al. | 356/106 R |
| 3,586,416 | 6/1971 | DeBitetto | 356/113 |
| 3,624,605 | 11/1971 | Aagard | 356/71 |
| 3,680,963 | 8/1972 | Edwards et al. | 356/107 |
| 3,816,649 | 6/1974 | Butters et al. | 356/109 |

*Primary Examiner*—John K. Corbin
*Assistant Examiner*—Conrad Clark
*Attorney, Agent, or Firm*—Homer O. Blair; Robert L. Nathans; Gerald H. Glanzman

[57] ABSTRACT

A system for adding or subtracting in real-time image detail of first and second images. In a first embodiment a plane parallel reflective image shear plate superimposes a first radiation beam carrying the first image with a second radiation beam carrying the second image to achieve exact registration of similar image detail. Depending upon the phase difference between the first and second beams, the beams either destructively or constructively interfere. Constructive interference results in amplitude addition of image detail in the first and second images. Destructive interference results in an image having only image detail which is different between the first and second images. A second embodiment adds a plane parallel source shear plate to the structure of the first embodiment, which results in several significant advantages. In the second embodiment radiation from a light source is first directed against the source shear plate which shears the radiation to derive the first and second radiation beams. The first and second radiation beams are then directed against the image shear plate which recombines the beams for interference while cancelling wavefront aberrations.

In a third embodiment of the invention, first and second radiation beams carrying details of first and second images are directed against a triangular configuration of a beam splitter and first and second mirrors which function together to superimpose the first and second radiation beams to achive exact registration of similar image detail. A fourth embodiment adds another triangular configuration of beam splitter and first and second mirrors to the structure of the third embodiment. The additional structure is utilized to shear a radiation beam from a source to derive the first and second radiation beams. The first and second radiation beams are then directed against the structure of the third embodiment which recombines the beams for interference while cancelling wavefront aberrations.

In a fifth embodiment, the reflective surfaces of a MachZehnder interferometer are utilized to combine first and second beams carrying details of first and second images for either constructive or destructive interference.

4 Claims, 5 Drawing Figures

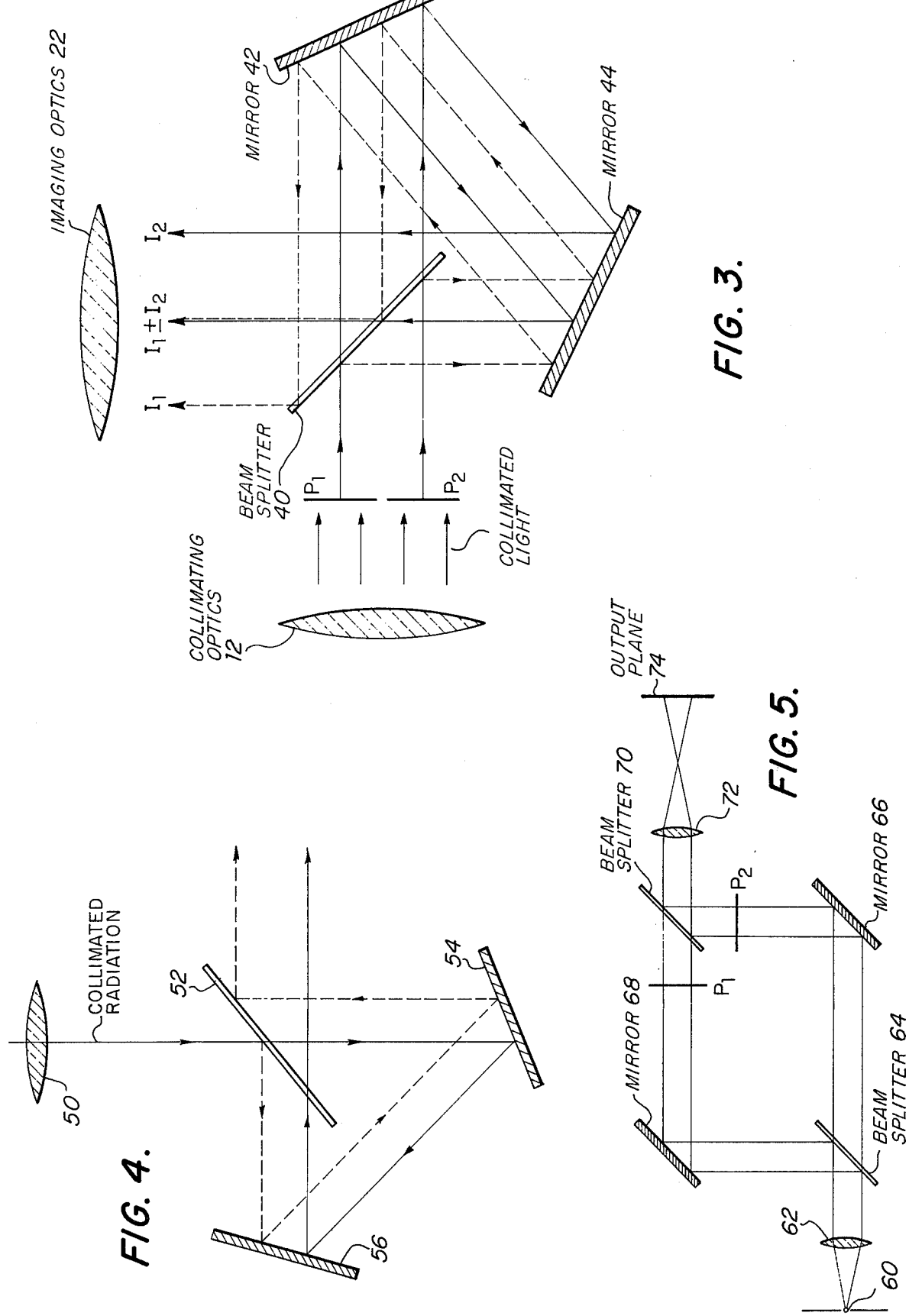

IMAGE SUBTRACTION/ADDITION SYSTEM

BACKGROUND OF THE INVENTION

The present invention relates generally to the interferometric arts, and more particularly pertains to interferometers which are useful for either adding or subtracting image detail in first and second images.

Image subtraction is useful to detect differences between images, and may be used in military applications and such commercial fields as urban development, highway planning, land use, new construction, and earth resources studies. Image subtraction might also find use in image communications as a means of bandwidth compression since it would be necessary to transmit only the differences between images in successive cycles rather than the entire image in each cycle.

The following methods of image subtraction and their advantages/disadvantages were investigated by the inventors.

I. Interferometric (Additive Subtraction) Methods
  A. Grating Shearing Method
    S. H. Lee, S. K. Yao, and A. G. Milnes, J. Opt. Soc. Am. 60, 1037 (1970).
    S. K. Yao and S. H. Lee, Appl. Opt. 10, 1154 (1971).
    L. S. Watkins, Appl. Opt. 12, 1880 (1973).
  B. Holographic Methods
    1. Gabor and Stroke Method
      D. Gabor, G. W. Stroke, R. Restrick, A. Funkhouser, and D. Brumm, Phys. Lett. 18, 116 (1965).
      G. W. Stroke, *An Introduction to Coherent Optics and Holography* (academic, New York, 1969, pp. 90-96.
      A. R. Shulman, *Optical Data Processing* (Wiley, New York, 1970), pp. 525-530.
    2. Bromley and Thompson Method
      K. Bromley, M. A. Monahan, J. F. Bryant, and B. J. Thompson, Appl. Phys. Lett. 14, 67 (1969).
      K. Bromley et al., Appl. Opt. 10, 174 (1971).
II. Coding Methods
  A. Ronchi Grating Coding
    1. K. S. Pennington, P. M. Will, and G. L. Shelton, Opt. Commun. 4, 113 (1970).
    2. S. R. Dashiell, A. W. Lohman, and J. D. Michaelson, Opt. Commun. 8, 105 (1973).
  B. Polarization Interference Fringe Coding
    Y. Belveaux and S. Lowenthal, Proc. IXth ICO-CIO Conference (Santa Monica, Calif.), Oct. 9-13, 1972 p. 221.
  C. Diffuser Coding
    S. Debrus, M. Francon, and C. P. Grover, Opt. Commun. 4, 172 (1971).
    S. Debrus et al., Opt. Commun. 6, 15 (1972).
    S. Debrus et al., Proc. IXth ICO-CIO Conference (Santa Monica, Calif.) Oct. 9-13, 1972, p. 152.
III. Positive-Negative Superposition (Multiplicative Subtraction) Method
  A. R. Shulman, Proc. IXth ICO-CIO Conference (Santa Monica, Calif.) Oct. 9-13, 1972, pp. 523-525.
  J. W. Goodman, *Introduction to Fourier Optics* (McGraw-Hill, New York, 1968), pp. 150-154.

Table 1 summarizes some characteristics of each of the different approaches.

From the table it may be seen that the grating-shearing method (I-A) is the simplest and quickest of the optical approaches, requiring only one step (the final optical processing stage) beyond the recording and developing of the two input photographs to be subtracted.

SUMMARY OF THE INVENTION

In accordance with a preferred embodiment, a system is disclosed for forming an interferogram between radiation carrying a first image and radiation carrying a second image. A radiation beam is introduced into the system, and first and second portions of the radiation beam are modulated respectively with the first and second images. A reflective means having the first and second modulated portions of the radiation beam incident thereon reflects at least one of the portions to superimpose by reflection image details in the first and second modulated portions of the wavefront which either constructively or destructively interfere to add or subtract image details in the first and second images.

TABLE 1

| Method | Number of Stages* | Real-Time Optical Subtraction Capability | Requires Exact Registration of Photographs | Technique Available for Real-Time Adjustment of Image Registration | Requires Coherent or Quasi-Coherent Light for Optical Processing | Requires Laser Light for Optical Processing | Requires Liquid Gates | Additional Comments |
|---|---|---|---|---|---|---|---|---|
| I-A | 5 | Yes | Yes | Yes | Yes | No | Yes | Except for liquid gate requirement, seems to be best possible method. |
| I-B-1 | 9 | No | Yes | No | Yes | Yes | Yes | Because of laser light, subject to speckle noise problems. |
| I-B-2 | 7 | Yes | Yes | Yes | Yes | Yes | Yes | Same comments as for I-C-1; however, moire fringes in I-C-2 is the easiest and most efficient means of all methods for determining when exact registration of images occurs. |
| II-A-1 (Optical Mode) | 9** | No | Yes | No | Yes | No | No | Requires extremely precise translational accuracy. |
| II-A-2 (Optical Mode) | 8** | No | Yes | No | Yes | No | No | |
| II-B | 9** | No | Yes | No | Yes | No | No | Avoids translation accuracy problem of II-A; however, requires monochromatic light for the final optical processing stage. |

TABLE 1-continued

| Method | Number of Stages* | Real-Time Optical Subtraction Capability | Requires Exact Registration of Photographs | Technique Available for Real-Time Adjustment of Image Registration | Requires Coherent or Quasi-Coherent Light for Optical Processing | Requires Laser Light for Optical Processing | Requires Liquid Gates | Additional Comments |
|---|---|---|---|---|---|---|---|---|
| II-C | 9** | No | Yes | No | Yes | No | No | Avoids translation accuracy problem of II-A; has additional capability of bettering signal to noise ratio, but to do this requires additional stages. |
| III | 7 | Yes | Yes | Yes | No | No | No | Requires extremely tight tolerances on exposure and developing processes. |

*Includes four stages for exposing (in incoherent light) and developing the two photographs to be subtracted.
**For two changing scenes which are separated in time by a small amount, these methods can be reduced to five stages In the BACKGROUND OF THE INVENTION several methods of image subtraction/addition are compared, and it was concluded that the grating-shearing approach is the simplest and quickest of the optical approaches known in the prior art. In Table 2, two embodiments of Applicants' invention are compared with the interferometric grating-shearing approach.

From the table it may be seen that the single plate and double plate embodiments of Applicants' invention offer considerable advantages over the grating-shearing approach. With Applicants' invention, fewer degrees of freedom are necessary to achieve image registration and subtraction. Also, for the embodiment with the single reflective plate, the aperture of the input beam collimating optics may be smaller than the grating-shearing system. It may be smaller still for Applicants' two-plate embodiment. The two-plate embodiment offers still more advantages. There are minimal requirements on the optical quality of the input optics since the input beam is first sheared and then recombined for interference which cancels any wavefront aberrations. As a result, the tolerances on the optical flatness of each surface of each plate are less strict for the double-plate embodiment than for the single-plate embodiment. Also, with the double-plate system, it should be possible to use an extended source of radiation, and even a white light source.

TABLE 2

| Shearing Method | Has real-time subtraction capability | Requires liquid gates | Requires coherent or quasi-coherent light | Minimum number of degress of freedom necessary to perform image registration and subtraction | Minimum aperture of collimator (in terms of photograph width $W_P$) | Required quality of optical components so that wavefront degradation from total systems $\leq \lambda/16$ (RSS of peak-to-peak | | Minimum thickness l of each plate | Minimum width $W_{sp}$ of each plate | Maximum wedge angle (in arc-seconds) between surfaces of each plate |
| | | | | | | Collimator | Each surface of shear plate(s) | | | |
|---|---|---|---|---|---|---|---|---|---|---|
| Grating | Yes | Yes | Yes | 4$^b$ | 3$W_P{}^d$ | $\leq \lambda/32^d$ | not applicable | not applicable | not applicable | not applicable |
| Single-Plate | Yes | Yes | Yes | 3$^c$ | 2$W_P{}^3$ | $\leq \lambda/32$ | $\leq \lambda/45$ | 4/3 $W_P$ | 3$W_P$ | $\dfrac{2^g}{W_p(\text{in cm})}$ |
| Double-Plate | Yes | Yes | No$^a$ | 3$^c$ | $W_p{}^{a,e,f}$ | none$^f$ | $\leq \lambda/32$ | 4/3 $W_P$ | 3$W_P$ | $\dfrac{1^h}{W_p(\text{in cm})}$ |

Footnotes:
$^a$It should be possible to use an extended source as well as a white light source.
$^b$Three translational (x,y,z), one rotational ($\Psi$).
$^c$Three rotational ($\Theta,\phi,\Psi$).
$^d$ Assuming two lenses are used—one for collimation, one for focussing onto the grating. When one lens is used, the lens need only be as good as $\lambda/16$ although it aperture must then necessarily *exceed* 3$W_P$.
$^e$Shear plate indicates when light is perfectly collimated.
$^f$High -optical-quality collimator not necessary.
$^g$Wedge angle can be compensated by slightly defocussing collimator.
$^h$If both plates are cut from a sample with a constant wedge, plates can be oriented 180° with respect to each other and compensate for wedge.

In addition to those advantages already stated, this invention has the following additional advantages. The invention results in true subtraction, as opposed to multiplication, of optical images. The invention is a parallel optical data processor, and serial scanning and/or a computer are not required. The invention may utilize original photographic transparencies rather than requiring conversion into other mediums such as a hologram or a contact print transparency.

BRIEF DESCRIPTION OF THE DRAWINGS

FIG. 3 illustrates a third embodiment of applicants' invention in which the reflective means includes a beam splitter and first and second mirrors located in a triangular configuration.

FIG. 4 illustrates additional structure of a fourth embodiment which is utilized to shear the radiation beam to derive the first and second input radiation beams of FIG. 3.

FIG. 5 illustrates a fifth embodiment of applicants' invention wherein a Mach-Zehnder interferometer is utilized to achieve image subtraction or addition.

DESCRIPTION OF A PREFERRED EMBODIMENT

Figure 1:
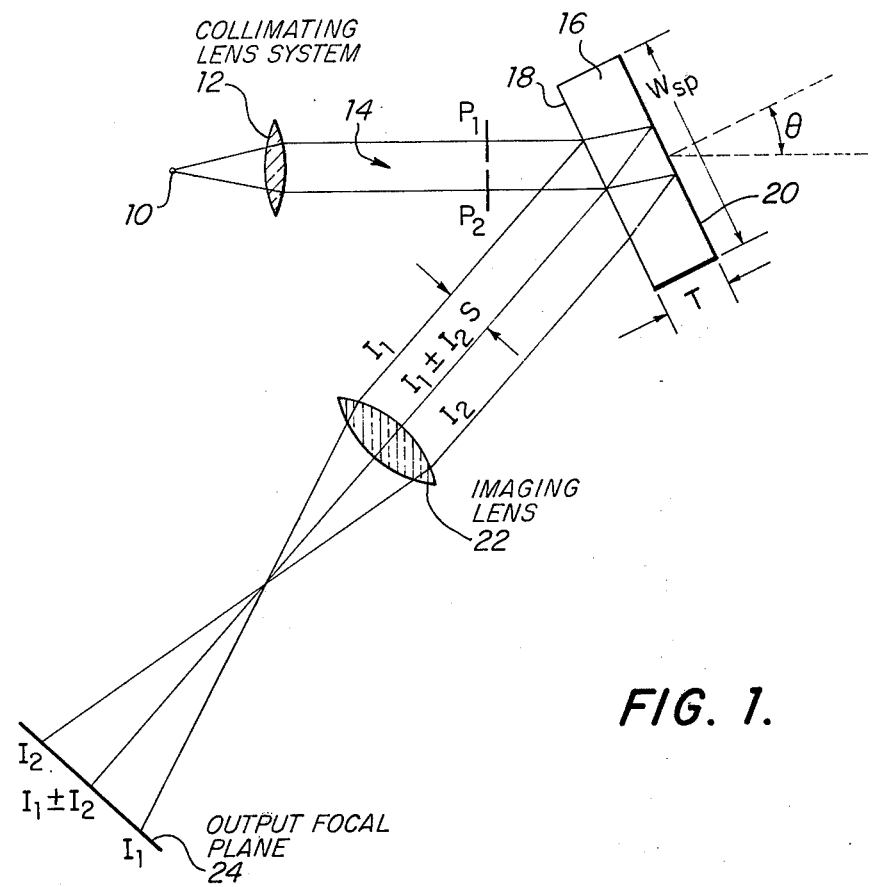
FIG. 1 illustrates a first embodiment of applicants' invention for achieving either image subtraction or addition by using a single plane parallel reflective image shear plate.

Referring to FIG. 1, there is illustrated a first embodiment of applicants' invention. In that embodiment, radiation from a coherent or quasi-coherent light source 10 passes through a high quality collimating optical system 12 to achieve a collimated beam 14. A first portion of the radiation beam is passed through a first transparency $P_1$ having thereon a first image such that the first portion of the beam is modulated with image detail of the first image. Likewise, a second portion of the beam is passed through a second image in a second transparency $P_2$ to modulate it with image detail of the second image. The first and second transparencies would normally be located within liquid gates to eliminate radiation path differences caused by different thicknesses and granularities of the two transparencies. The first and second portions of the radiation beam, containing respectively image detail of the first and second images, are directed against a plane parallel reflective image shear plate 16 having a thickness T, a width $W_{sp}$, and being inclined at an angle $\theta$ relative to the incident beams. The plane parallel reflective image shear plate has first and second surfaces 18 and 20 which reflect some of each of the portions of the radiation beam. The first portion of the radiation beam is partially reflected by the first surface 18, resulting in the beam labeled $I_1$, and is partially reflected by the second surface 20, forming parts of the beam labeled $I_1 \pm I_2$. Likewise, the second portion of the radiation beam is partially reflected by the first surface 18, forming the other part of the beam labeled $I_1 \pm I_2$, and is partially reflected by the second surface 20, resulting in the beam labeled $I_2$. By setting the angle $\theta$ properly, image detail in the first and second portions of the radiation beam may be brought into exact registration in the middle beam $I_1 \pm I_2$. Advantageously when the system is being set up, adjustment of the angle $\theta$ is utilized to simultaneously adjust registration of the images and the relative phases of the two beams. Depending upon the phase difference between the two beams forming $I_1 \pm I_2$, the images $I_1$ and $I_2$ are either subtracted or added. If the optical path length between the beam carrying image $I_2$, reflected by the surface 18, and the beam carrying the image $I_1$, reflected by the surface 20, is an even number of wavelengths ($n\lambda$) such that there is no phase difference between the beams carrying $I_1$ and $I_2$, then the image detail in the first and second images will constructively interfere and result in image addition. On the other hand, if there is a 180° phase difference between the beams then destructive interference will occur which results in image subtraction. An imaging lens system 22 is utilized to image $I_1 \pm I_2$ to an output focal plane 24. The image in the output focal plane 24 may be observed directly in real-time, or may be recorded on film or with some photoelectric technique. The images of beam $I_1$ and beam $I_2$ are also separately formed in the focal plane 24 and are ordinarily not of interest. However, in some instances it may be desirable to compare the image in the central beam $I_1 \pm I_2$ with either of the images $I_1$ or $I_2$, in which case more than one image in the focal plane would be of interest. Further, with the embodiment of FIG. 1, the diameter of the collimating optics need not be larger than twice the width of one transparency. (The grating-shearing method requires a diameter three times the width of one transparency.)

In one operative embodiment of the invention illustrated in FIG. 1, the collimated beam 14 had a wavelength $\lambda$ of 6,328 A., the shear plate 16 had a width $W_{sp}$ of 2 inches, a thickness T of ½ inch, and was inclined at an angle $\theta$ of 45°, the transparencies $P_1$ and $P_2$ had diameters of approximately 5/16 inch.

Figure 2:
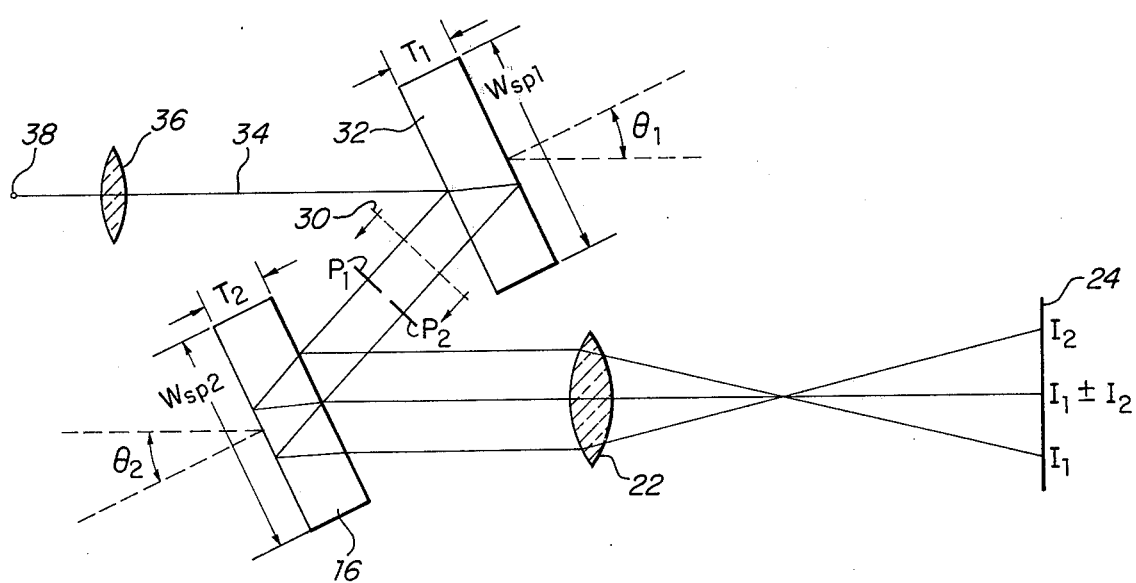
FIG. 2 illustrates a second and the preferred embodiment of applicants' invention which is similar to the embodiment of FIG. 1 but adds to it a plane parallel reflective source shear plate.

FIG. 2 illustrates a second and more preferred embodiment of applicants' invention. Forward of line 30 this embodiment is essentially similar to the embodiment of FIG. 1. The embodiment of FIG. 2 adds to the embodiment of FIG. 1 a plane parallel reflective source shear plate 32. The purpose of the source shear plate 32 is to generate the first and second radiation beams which are an input to the structure of FIG. 1. This results in the advantage that when the first and second radiation beam are recombined for interference by the image shear plate, aberrations in the wavefront coming from the collimator are cancelled. Because of this cancellation of wavefront aberrations, the collimating lens system 36 need not be of high optical quality. Further, with the embodiment of FIG. 2 the diameter of the collimating optics need not be larger than the width of one transparency. Also, the requirements on the optical flatness of each surface of both plates 16 and 32 are reduced. Further, the light 38 may be an extended source. Also, with the embodiment of FIG. 2, the optical path of the two beams may be made equal to within a half wave. By coating the back surface of either the source shear plate or the image shear plate with a dielectric coating with refractive index greater than the plate, an additional phase change of a half wave will be introduced. Thus, the optical paths can be made precisely equal, and, as a result, it should be possible to use a white light source. (An anti-reflection coating should be deposited onto the higher-index dielectric coating in order to prevent unwanted additional reflections.)

FIG. 3 illustrates a third embodiment of applicants' invention wherein the reflective means includes a beam splitter 40, a first mirror 42 and a second mirror 44, all of which are positioned in a triangular configuration. The embodiment of FIG. 3 operates in a manner substantially similar to the embodiments of FIG. 1. In addition, the embodiment of FIG. 3, allows use with a white light radiation source. In the drawing, radiation which is transmitted by the beam splitter 40 is depicted by a solid line, and radiation which is reflected by the beam splitter 40 is depicted by a dashed line. In FIG. 3, first and second portions of a radia-40 is depicted by a dashed line. In FIG. 3, first and second portions of a radiation beam are passed through transparencies $P_1$ and $P_2$. Some of the first portion of the radiation beam passing through transparency $P_1$ is transmitted by beam splitter 40, reflected in order by mirrors 42 and 44, and transmitted again by beam splitter 40 into a central beam designated $I_1 \pm I_2$. Another part of the first portion of the radiation beam passing through transparency $P_1$ is reflected in order by beam splitter 40, mirror 44, mirror 42, and again by beam splitter 40 to form beam $I_1$. A part of the second portion of the radiation beam passing through transparency $P_2$ is reflected in order by beam splitter 40, mirror 44, mirror 42, and again by beam splitter 40 into the central output beam $I_1 \pm I_2$. Another part of the second portion of the radiation beam passing through transparency $P_2$ is transmitted by beam splitter 40, and reflected in order by mirrors 42 and 44 to form an output radiation beam $I_2$. The beams $I_1$, $I_1 \pm I_2$, and $I_2$ are essentially similar to the output beams of the embodiments of FIGS. 1 and 2, and may be utilized in the same manner as in those embodiments. It should be noted that in other embodiments similar to FIG. 3 other numbers (other than two) of reflecting mirrors might be utilized to achieve the same result. Likewise, the same result might be achieved with prisms rather than mirrors.

FIG. 4 illustrates a triangular configuration, similar to the triangular configuration shown in FIG. 3, which is utilized to derive the two input beams of radiation for the embodiment of FIG. 3. This allows use of an extended source of radiation as well as a white light source. Collimated radiation from a collimating optical system 50 is incident upon a beam splitter 52 which reflects a portion of the beam and passes a portion of the beam. The passed and reflected portions of the beam are reflected off mirrors 54 and 56 as illustrated to derive two sheared radiation beams. In context with the embodiment of FIG. 3, three beams would pass through transparencies $P_1$ and $P_2$. This embodiment is similar in principle to the embodiment of FIG. 2 in that radiation from a radiation source is sheared in order to achieve cancellation of wavefront aberrations when the beams are recombined in interference.

FIG. 5 illustrates how the teachings of the present invention may be applied to a Mach-Zehnder interferometer. Radiation from a source 60 travels through a collimating optical system 62 to a beam splitter 64 wherein a portion of the beam is reflected and a second portion of the beam is transmitted. The transmitted and reflected beams are reflected respectively by mirrors 66 and 68 to a further beam splitter 70 which functions as a reflective means to recombine the two beams. Transparencies $P_1$ and $P_2$ are positioned in the two beams somewhere between the beam splitter 64 and beam splitter 70. The first and second beam portions thus carry respectively the first and second images such that when the first and second beam portions are recombined by beam splitter 70, common image detail is either added or subtracted by constructive or destructive interference. As shown an optical system 72 is utilized to image the output in an output plane 74. An extended source as well as a white light source can be used as a radiation source for the Mach-Zehnder interferometer.

The use of a source shear plate in the embodiment of FIG. 2 results in the recombined beams having essentially equal path distances so that the radiation source may be white light. Likewise, the use of the structure shown in FIGS. 3 or 4 results in the recombined radiation beams having equal path distances so that a white light source may be utilized. In other embodiments, the source shear plate of FIG. 2 might be utilized in place of the triangular configuration of FIG. 4, and likewise the triangular configuration of FIG. 4 might be utilized instead of the source shear plate of FIG. 2. However, this would result in the two radiation beams which are subsequently recombined having different path lengths. This would allow the use of an extended source of radiation, but would not allow operation with a white light radiation source.

In some instances the first and second transparencies may have images of the same objects, but taken with different levels of illumination. With that condition, one transparency would normally be darker than the other transparency, and if the images were subtracted from each other, the undesired difference in darkness would be carried into the image $I_{1 - I2}$. This difference in brightness may be compensated for by placing a neutral density filter adjacent to the brighter image. In this manner, different illumination levels may be compensated for to eliminate spurious differences between the images.

Although the preferred embodiment illustrates $P_1$ and $P_2$ as transparencies, in other embodiments the image might be carried in other modes. For instance if the Pockels Readout Optical Memory (PROM) device illustrated in the December, 1972 issue of Applied Optics were utilized, then one or both of the images could be formed in real-time.

While several embodiments have been described, the teachings of this invention will suggest many other embodiments to those skilled in the art.

We claim:

1. A system for optically adding or subtracting image detail of first and second images in parallel and comprising:
    a. means for introducing a radiation beam into the system;
    b. means for modulating a first portion of the radiation beam with said first image, whereby said first portion of the radiation beam contains image detail of said first image:
    c. means for modulating a second portion of said radiation beam with said second image, whereby said second portion of the radiation beam contains image detail of said second image; and,
    d. reflective means, having said first and second modulated portions of the radiation beam incident thereon, for superimposing the interference image detail in said first modulated portion of the wavefront with image detail in said second modulated portion of the wavefront, for destructively or constructively interfering common image detail in said first and second modulated wavefronts for optically subtracting or adding image detail in the first and second images, said reflective means includes a beam splitter means and mirror means, said beam splitter means transmitting part of said first portion of the radiation beam to said mirror means for reflection back to, and transmission by, said beam splitter means, said beam splitter means also reflecting part of said second portion of the radiation beam to said mirror means for reflection back to, and reflection by, said beam splitter means to superimpose it on said part of the first portion of the radiation beam which has been transmitted twice by said beam splitter means.

2. A system as set forth in claim 1 wherein said reflective means superimposes image detail in said first modulated portion of the wavefront in phase with image detail in said second modulated portion of the wavefront to constructively interfere and add image detail in the first and second images.

3. A system as set forth in claim 1 wherein said reflective means superimposes image detail in said first modulated portion of the wavefront 180° out of phase with image detail in said second modulated portion of the wavefront to destructively interfere and subtract image detail in the first and second images.

4. A system as set forth in claim 1 and including an optical system for focusing radiation reflected off said reflective means to a focal plane.

* * * * *